United States Patent
Wlodkowski et al.

(10) Patent No.: US 12,340,811 B2
(45) Date of Patent: *Jun. 24, 2025

(54) VOICE-ENABLED SCREEN READER

(71) Applicant: Comcast Cable Communications, LLC, Philadelphia, PA (US)

(72) Inventors: Thomas Wlodkowski, Sterling, VA (US); Michael J. Cook, Flemington, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/458,777

(22) Filed: Aug. 30, 2023

(65) Prior Publication Data

US 2024/0249729 A1      Jul. 25, 2024

Related U.S. Application Data

(63) Continuation of application No. 16/809,235, filed on Mar. 4, 2020, now Pat. No. 11,783,842, which is a (Continued)

(51) Int. Cl.
*G10L 13/00*     (2006.01)
*G06F 3/04842*   (2022.01)
(Continued)

(52) U.S. Cl.
CPC .......... *G10L 17/22* (2013.01); *G06F 3/04842* (2013.01); *G06F 3/04892* (2013.01); *G10L 15/08* (2013.01); *H04N 21/472* (2013.01); *G09B 21/006* (2013.01); *G10L 13/04* (2013.01); *G10L 15/22* (2013.01); *G10L 15/26* (2013.01); *H04L 12/282* (2013.01); *H04M 3/4938* (2013.01)

(58) Field of Classification Search
None
See application file for complete search history.

(56) References Cited

U.S. PATENT DOCUMENTS 5,903,727 A    5/1999  Nielsen
6,182,045 B1   1/2001  Kredo et al.
(Continued)

FOREIGN PATENT DOCUMENTS

JP    2006101561 A    4/2006

OTHER PUBLICATIONS

Translation of JP2006-101561 published on Apr. 13, 2006. (Year: 2006).

*Primary Examiner* — Richard Z Zhu
(74) *Attorney, Agent, or Firm* — Banner & Witcoff, Ltd.

(57) ABSTRACT

In some embodiments, a system may process a user interface to identify textual or graphical items in the interface, and may prepare a plurality of audio files containing spoken representations of the items. As the user navigates through the interface, different ones of the audio files may be selected and played, to announce text associated with items selected by the user. A computing device may periodically determine whether a cache offering the interface to users stores audio files for all of the interface's textual items, and if the cache is missing any audio files for any of the textual items, the computing device may take steps to have a corresponding audio file created.

20 Claims, 10 Drawing Sheets

Related U.S. Application Data continuation of application No. 15/449,336, filed on Mar. 3, 2017, now Pat. No. 10,636,429, which is a continuation of application No. 14/193,590, filed on Feb. 28, 2014, now Pat. No. 9,620,124.

(51) Int. Cl.

| | |
|---|---|
| *G06F 3/04892* | (2022.01) |
| *G10L 15/08* | (2006.01) |
| *G10L 17/22* | (2013.01) |
| *H04N 21/472* | (2011.01) |
| *G09B 21/00* | (2006.01) |
| *G10L 13/04* | (2013.01) |
| *G10L 15/22* | (2006.01) |
| *G10L 15/26* | (2006.01) |
| *H04L 12/28* | (2006.01) |
| *H04M 3/493* | (2006.01) |

(56) References Cited

U.S. PATENT DOCUMENTS

| | | | |
|---|---|---|---|
| 6,205,427 B1 | 3/2001 | Itoh et al. | |
| 6,721,781 B1 | 4/2004 | Bates et al. | |
| 7,237,254 B1 | 6/2007 | Omoigui | |
| 7,286,749 B2 | 10/2007 | Shiiyama | |
| 7,450,821 B2 | 11/2008 | Shiiyama | |
| 7,921,296 B2 | 4/2011 | Haitsma et al. | |
| 7,966,184 B2 | 6/2011 | O'Conor et al. | |
| 8,073,112 B2 | 12/2011 | Jaiswal et al. | |
| 8,126,859 B2 | 2/2012 | Rath et al. | |
| 8,229,748 B2 | 7/2012 | Chang et al. | |
| 8,566,418 B2 | 10/2013 | Sheshagiri et al. | |
| 8,766,079 B2 | 7/2014 | Utsuki et al. | |
| 8,838,673 B2 | 9/2014 | Morford | |
| 8,996,376 B2 | 3/2015 | Fleizach et al. | |
| 9,245,018 B2 * | 1/2016 | Mack | G09B 19/04 |
| 9,473,825 B2 * | 10/2016 | Gossweiler, III | H04N 21/4668 |
| 9,754,480 B2 | 9/2017 | Arling | |
| 10,726,871 B2 * | 7/2020 | Gilson | H04N 21/2387 |
| 2002/0147593 A1 | 10/2002 | Lewis et al. | |
| 2003/0046401 A1 | 3/2003 | Abbott et al. | |
| 2003/0072556 A1 | 4/2003 | Okujima et al. | |
| 2004/0128136 A1 | 7/2004 | Irani | |
| 2005/0033577 A1 | 2/2005 | Bradley et al. | |
| 2005/0094969 A1 | 5/2005 | Hsi | |
| 2007/0033053 A1 | 2/2007 | Kronenberg et al. | |
| 2008/0300012 A1 | 12/2008 | An | |
| 2010/0094444 A1 | 4/2010 | Utsuki et al. | |
| 2012/0210228 A1 | 8/2012 | Wang et al. | |
| 2013/0018701 A1 | 1/2013 | Dusig et al. | |
| 2013/0159228 A1 | 6/2013 | Meijer et al. | |
| 2013/0346560 A1 | 12/2013 | Macchietti et al. | |
| 2014/0327677 A1 | 11/2014 | Walker | |
| 2015/0154976 A1 | 6/2015 | Mutagi | |

\* cited by examiner

VOICE-ENABLED SCREEN READER

CROSS-REFERENCE TO RELATED APPLICATIONS

This application is a continuation of and claims priority to U.S. patent application Ser. No. 16/809,235, filed Mar. 4, 2020, which is a continuation of U.S. patent application Ser. No. 15/449,336, filed Mar. 3, 2017 (now U.S. Pat. No. 10,636,429), which is a continuation of U.S. patent application Ser. No. 14/193,590, filed Feb. 28, 2014 (now U.S. Pat. No. 9,620,124), each of which is incorporated by reference herein in its entirety.

BACKGROUND

Many user interfaces, such as video program listings, electronic program guides and Internet pages, are visually focused with graphical or textual labels and information that is meant to be seen. This presents a hurdle to users with impaired vision and/or inability to read textual content. There remains an ever-present need to assist visually-impaired and/or illiterate users in navigating through and consuming such content.

SUMMARY

The following summary is for illustrative purposes only, and is not intended to limit or constrain the detailed description.

Some of the features disclosed herein relate to preprocessing a user interface, such as a screen of an Internet page, a content description or listing, or an electronic program guide (EPG), to identify the various graphics, textual words or phrases in the user interface (e.g., menu labels, program titles and descriptions, times, instructions for use, etc.), and to generate audio files containing spoken versions of the words or phrases, or descriptions of graphical objects. These audio files, and their corresponding textual words or phrases, may be uniquely associated with a voice announcement identifier, to simplify processing when an interface or device, such as a user's web browser on a smartphone, computer, etc. accesses the user interface and requests to hear spoken versions of the interface's textual contents. In some embodiments, the voice announcement identifier may simply be a hashed version of the announcement text itself, or the text itself.

In some embodiments, one or more caches, e.g., cache servers, may act as proxies for the user interface and may be network caches. The cache may store a copy of a particular user interface, such as a current set of screens for an EPG, and may store audio files containing spoken versions of the various textual or graphical items of the EPG screens. The cache server may also store audio files that do not directly correspond to a single piece of text. For example, some audio files may contain introductory descriptions for a screen or instructions (e.g. "Welcome to the guide. To continue with voice-guided navigation, press the 'D' button, located above the number '3' button of your remote."), or may contain spoken words or sounds that do not have a corresponding text on the displayed interface.

As the user navigates through the interface, such as by pressing arrow buttons to highlight different items on the screen, the device may locate the identification code corresponding to a currently highlighted textual item (e.g., a currently-highlighted video program title in an EPG), and send a query to the cache to determine if the cache has a copy of the audio file corresponding to the identification code. If it does, the cache will return the requested audio file to the user's client device. If it does not, then the cache may issue a request to an audio look up device or service, which can coordinate the retrieval or creation of the desired audio file.

The audio look up device may coordinate the retrieval by first obtaining the full textual item. The original request from the user or device may have simply had the identification code for the text, and not the full text. The look up device can retrieve the full text either from the user device, or by issuing a request to another device that handles (e.g., stores, associates, creates) the text, such as a metadata computing device. The metadata computing device may use the identification to locate the full text (e.g., from a text database or from another source), and may return the full text to the audio look up device. The audio look up device may then pass the full text to a text-to-speech conversion device, which may convert the full text to an audio file of spoken (or otherwise audible) text and return it to the look up device.

The audio look up device may receive the audio file from the text-to-speech conversion server, and may deliver the audio file to the cache in response to a request (e.g., from the cache or elsewhere). The response may include additional information, such as an expiration time or date indicating a time duration for which the audio file is considered a valid spoken representation of the corresponding text. The user device may then play the audio file to assist the user in understanding what onscreen object has been selected or highlighted.

As noted above, the text may be processed in advance of a user's request to actually hear the spoken version of text. This preprocessing may be done, for example, when the interface is initially created, or at any other time prior to a user's request to hear the text (e.g., standard or common text phrases may be processed apart from creation of the interface). During that creation, the various text items in the interface (and other desired spoken messages, such as the introductory instructions mentioned above) may be identified, given a corresponding identification code, and passed to the text-to-speech conversion server. As the user interface is updated, additional text items appearing in the interface may also be proactively processed to generate audio files. In some embodiments, the metadata server may periodically (e.g., every 60 minutes) retrieve the current version of the user interface, and check to determine whether the current version contains any text items that do not currently have a corresponding audio file. The metadata server may do this by locating all of the voice announcement identifiers for a given screen of the user interface, and then issuing requests to the cache for audio files for each of the voice announcement identifiers (as noted above, this may be done using a hashed version of the text, or using the full text itself, as the voice announcement identifier). The requests may simply be header requests (e.g., HTTP HEAD requests), and the response from the cache may indicate whether the cache possesses the requested audio file. For example, the returned header may indicate a size of the requested audio file, and if the size is below a predetermined minimum size (e.g., the cache only has a placeholder file for the text item, or the cache's file for the text item contains just the text itself), and is too small to contain an audio sample, then the metadata device may conclude that the cache lacks a corresponding audio file for that voice announcement identifier's corresponding textual item. The metadata device may then initiate generation of the audio file by, for example, issuing a full retrieval request to the cache for the audio file (e.g., an HTTP GET request). The cache, upon determining that it does not possess the requested audio file, may then request the audio file from the audio look up device, as discussed above.

Alternatively, the metadata server may simply maintain a database of the various textual items, identifying their voice announcement identifiers and a corresponding value (e.g., yes/no) indicating whether an audio file has been created for that voice announcement identifier. The database may also indicate expiration times for the various audio files. The database may also maintain a mapping or index indicating the various interfaces or screens with which a particular audio file may be associated.

In some embodiments, the audio file playback may occur on different devices. For example, a group of friends in a room may be watching a program on a television, and they may navigate through an EPG. One of them may be visually impaired, and may have a smartphone application that is registered with the television (or an associated device such as the cache that the television is using a gateway, a set top box, etc.), and as entries in the EPG are highlighted, the audio files corresponding to the highlighted entries may be delivered to the smartphone, instead of (or in addition to) the display device, e.g., the television. In some embodiments, multiple users may each have their own separate registered devices, and they may receive their own audio file feeds as the EPG is navigated. The different users may also receive different versions of audio for the same highlighted text. For example, the text may be translated into different languages. As another example, different versions of the text may be used for different users based on their experience level. If one user is relatively new to the system, they may require a full audio explanation of how to use commands on a particular interface (e.g., "Welcome to the guide. To continue with voice-guided navigation, press the 'D' button, located above the number '3' button of your remote."). A more experienced user, however, may dispense with the explanations, and my simply need to know the screen identification for navigation purposes (e.g. "Guide."). Different users may establish user preferences on their respective devices (e.g., clients), and the preferences may be used in selecting the corresponding audio file for a given textual item. The EPG may include different organizational data identifying the different audio files that are needed for different users.

The summary identifies example aspects and is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
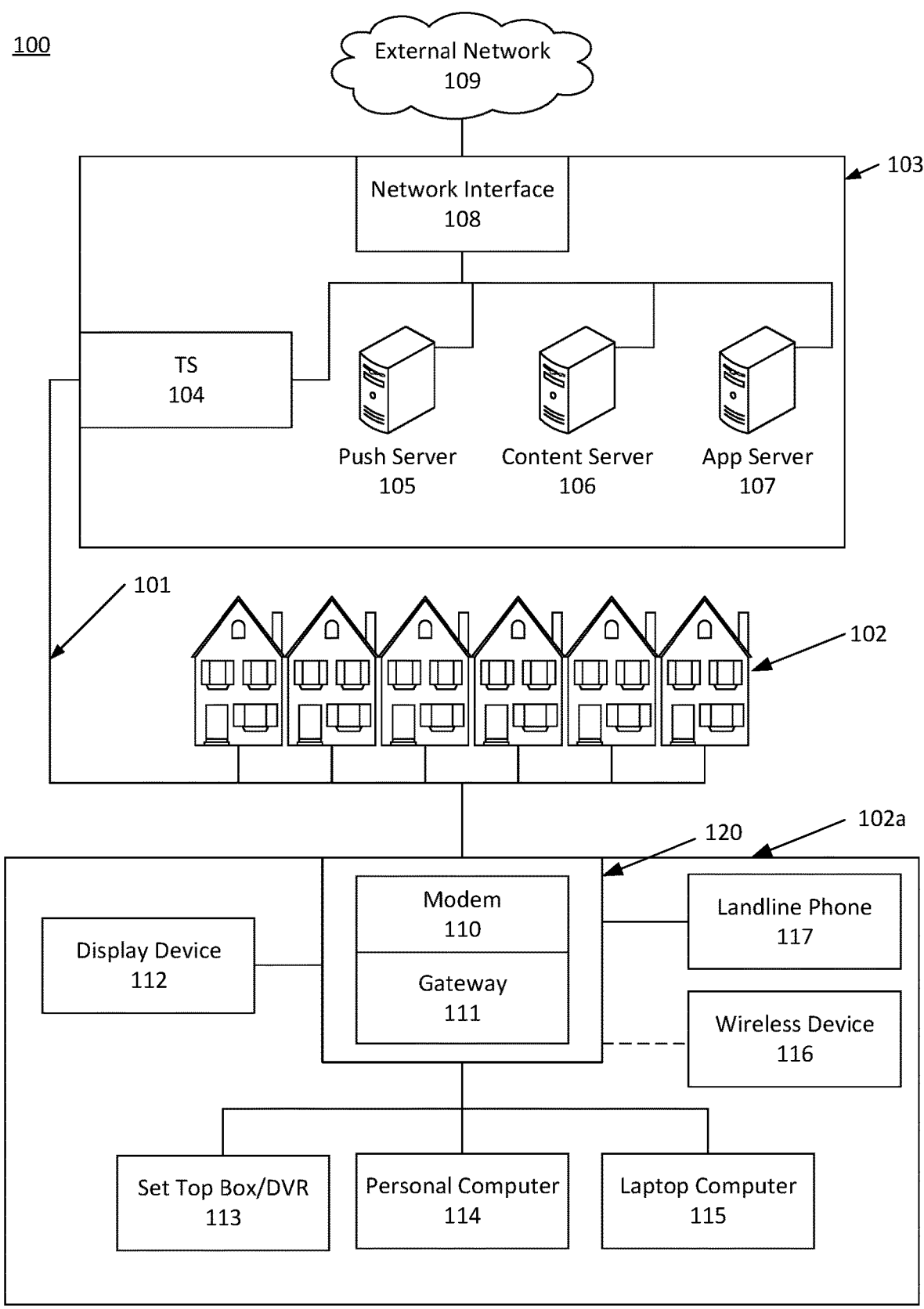
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of computing devices 105-107, such as servers, that may be configured to perform various functions. For example, the local office 103 may include a push notification computing device 105. The push notification device 105 may generate push notifications to deliver data and/or commands to the various premises 102 in the network (or more specifically, to the devices in the premises 102 that are configured to detect such notifications). The local office 103 may also include a content server computing device 106. The content device 106 may be one or more computing devices that are configured to provide content to users at their premises. This content may be, for example, video on demand movies, television programs, songs, text listings, etc. The content device 106 may include software to validate user identities and entitlements, to locate and retrieve requested content, to encrypt the content, and to initiate delivery (e.g., streaming) of the content to the requesting user(s) and/or device(s). Indeed, any of the hardware elements described herein may be implemented as software running on a computing device.

The local office 103 may also include one or more application server computing devices 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push device 105, content device 106, and application server 107 may be combined. Further, here the push device 105, content device 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone-DECT phones), mobile phones, mobile televisions, personal digital assistants (PDA), etc.), landline phones 117 (e.g. Voice over Internet Protocol VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
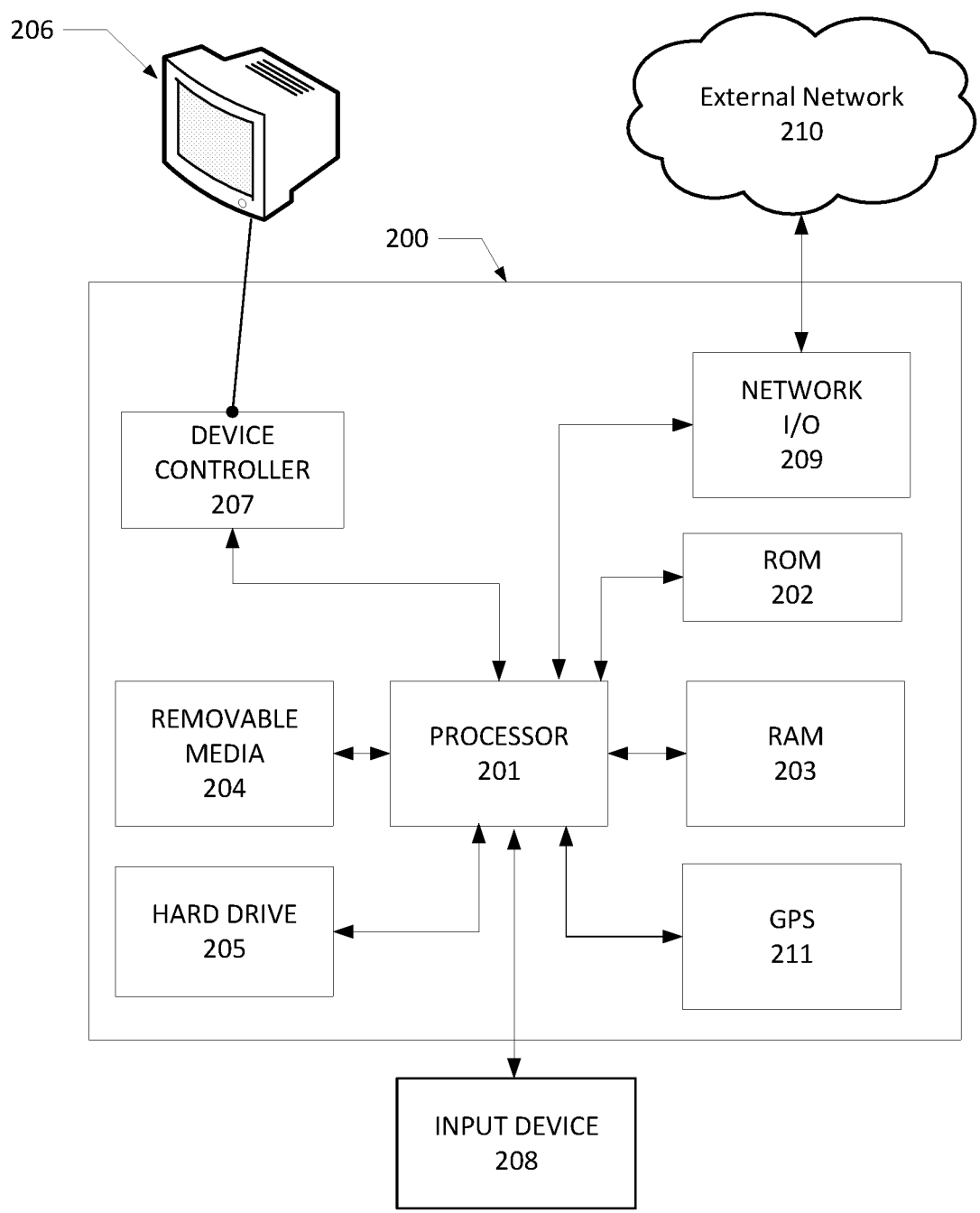
FIG. 2 illustrates an example computing device that can be used to implement any of the methods, servers, entities, and computing devices described herein.

FIG. 2 illustrates general elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein. The various computing devices, servers and hardware described herein may be implemented using software running on another computing device.

Figure 3A:
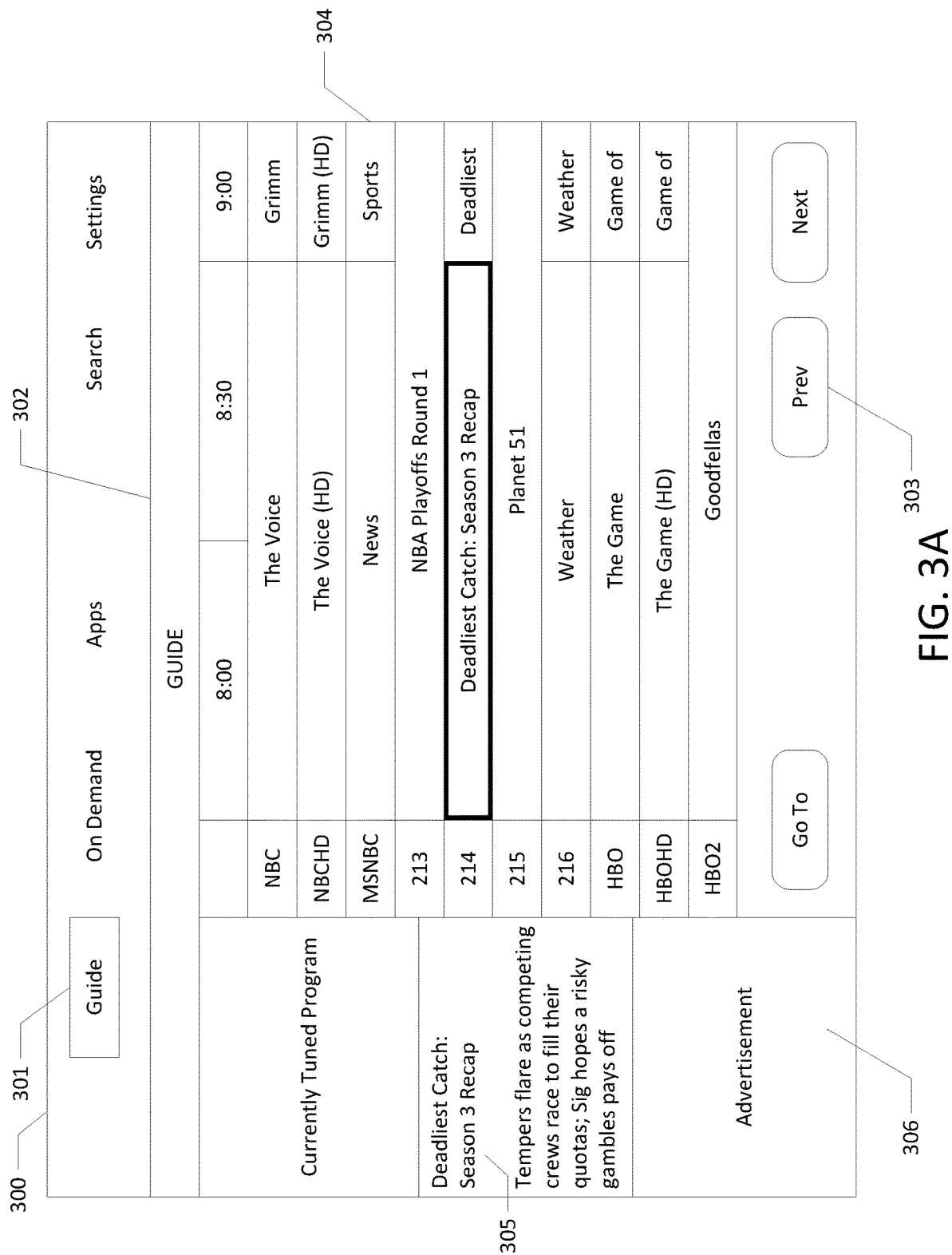
FIGS. 3A-E illustrate various screen displays and interface elements usable with features described herein.

As noted above, features herein relate generally to making user interfaces more accessible for the visually impaired. FIG. 3A shows an example user interface 300, which may present users with an electronic program guide (EPG) showing a transmission schedule of upcoming and current video programs. The interface 300 may be displayed on a user's display 112, and may be generated by a set-top box (STB) or digital video recorder (DVR) 113, a personal computer 114, wireless device 116, smart television having an integrated computing capability, or any other computing device. In some embodiments, the interface 300 may be provided as an Internet page, accessible to any device with a browser, such as a tablet computer or smart phone. The interface 300 includes a variety of textual items. For example, various selectable menu options 301 have text on them; labels 302 for screen areas (e.g., "Guide") and grid (e.g., the time labels across the top of the grid, and the channel/service labels down the left of the grid), navigation buttons 303, program listings 304, program descriptions 305 and advertisements 306 are some examples of textual items that may appear on an interface screen.

In some embodiments herein, each of these textual items may be associated with an audio file, such as an *.MP3 file, containing an annunciation of the textual items' text. The audio file can be a conversion of the textual item's text to audio, which may be a computerized reading aloud of the text (e.g., the annunciation for the text label "Go To" may be a computer or human voice saying "Go To"). As the user navigates through the interface 300, and selects different textual items, the user's device may receive the corresponding audio file and play its audio for the user to hear. For example, the FIG. 3 screen shows the "Deadliest Catch: Season 3 Recap" highlighted, and when the user highlighted that cell, the user's device may have received and played aloud an audio file annunciating that television program's title ("Deadliest Catch, Season 3 Recap").

Figure 3B:
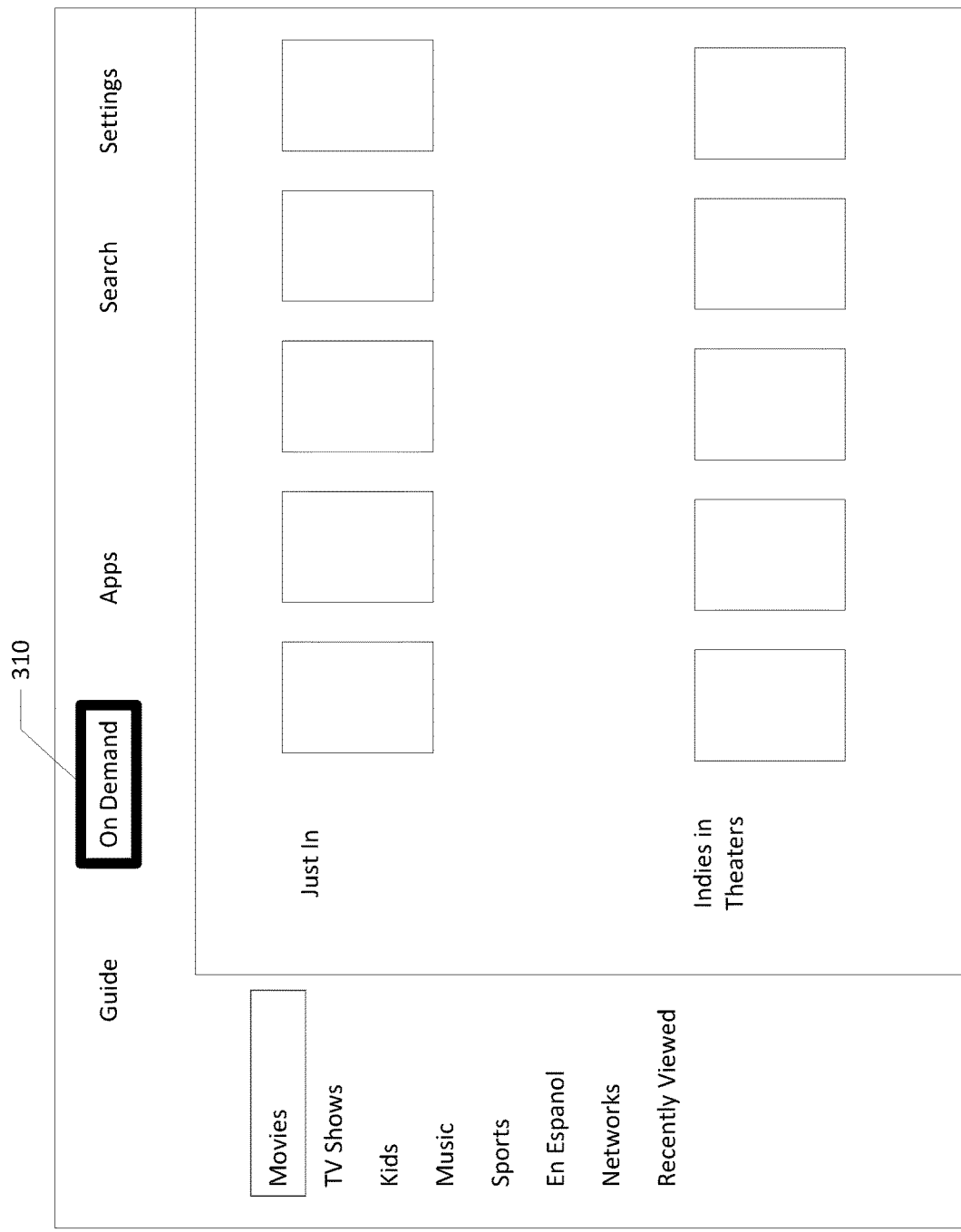
Figure 3C:
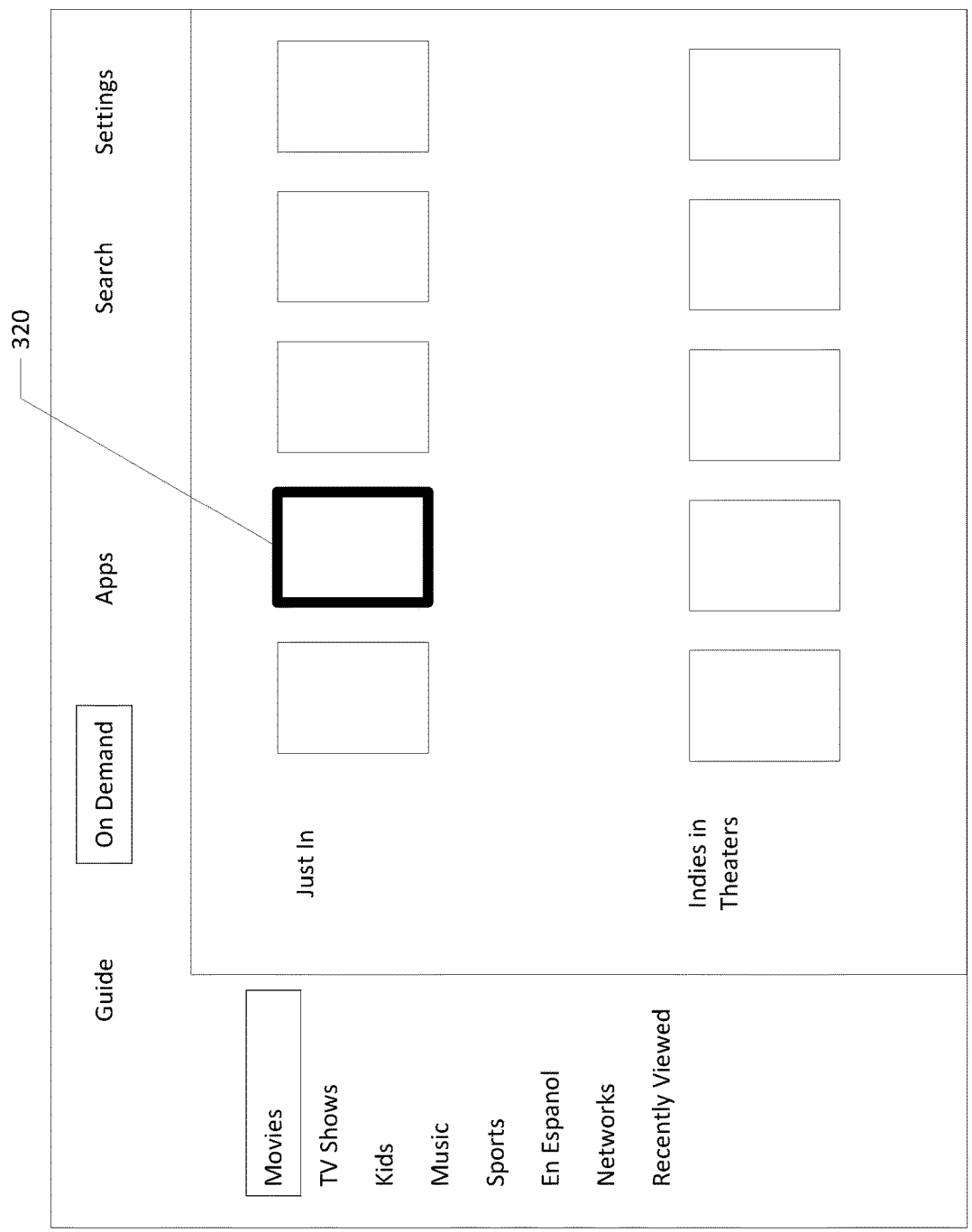
Figure 3D:
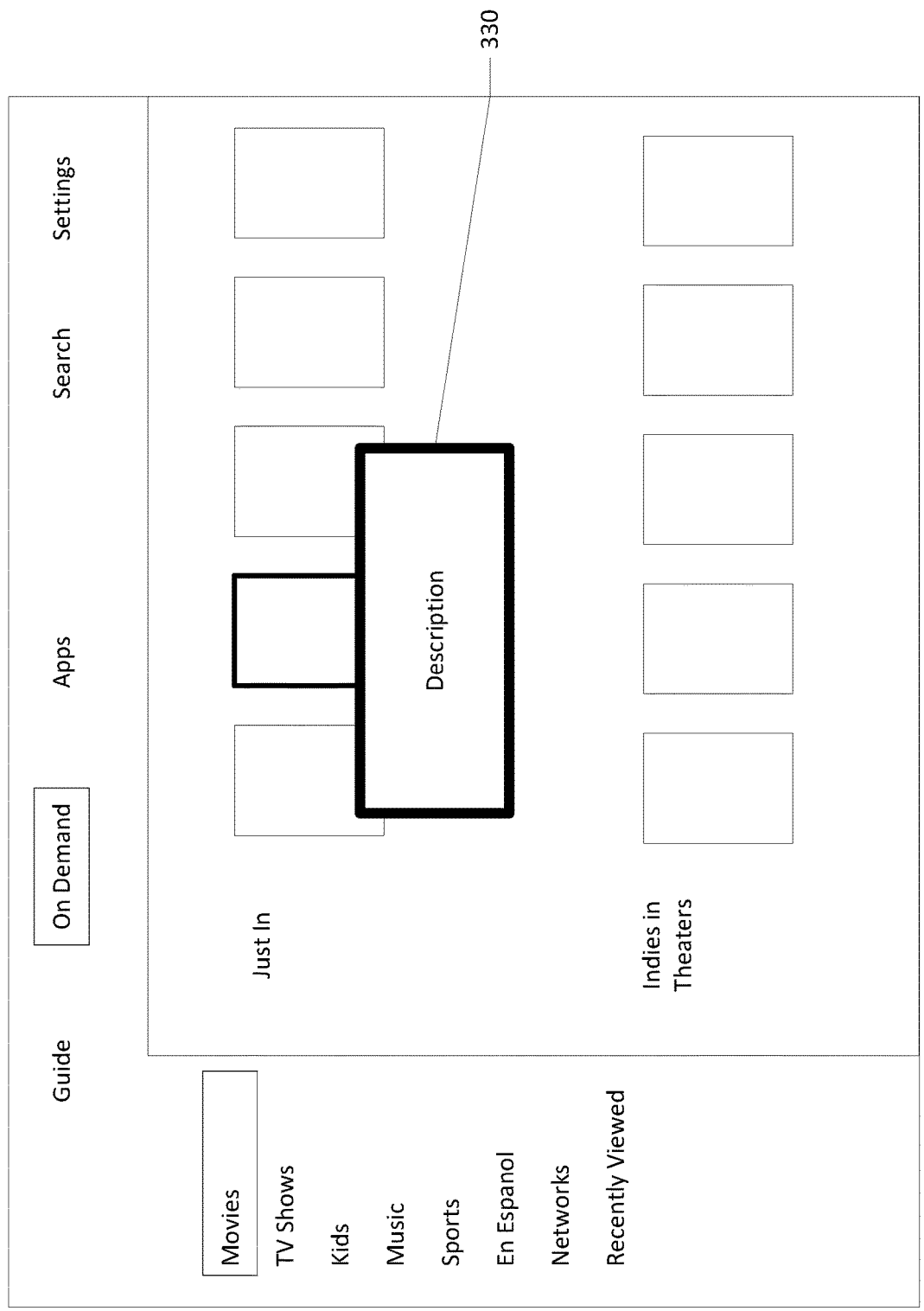

FIGS. 3B-D illustrate additional examples. In FIG. 3B, the user has highlighted the "On Demand" menu option 310, and may hear an announcement saying the following: "Voice guided navigation on. Press the Menu button to access the Main Menu. Press the Last button to return to the previous screen. Press the 0 button to learn your remote. On Demand Categories List <Name of category (Movies in this example)> button n of 11. Press arrow keys to review the screen, then press OK to select."

Figure 3E:
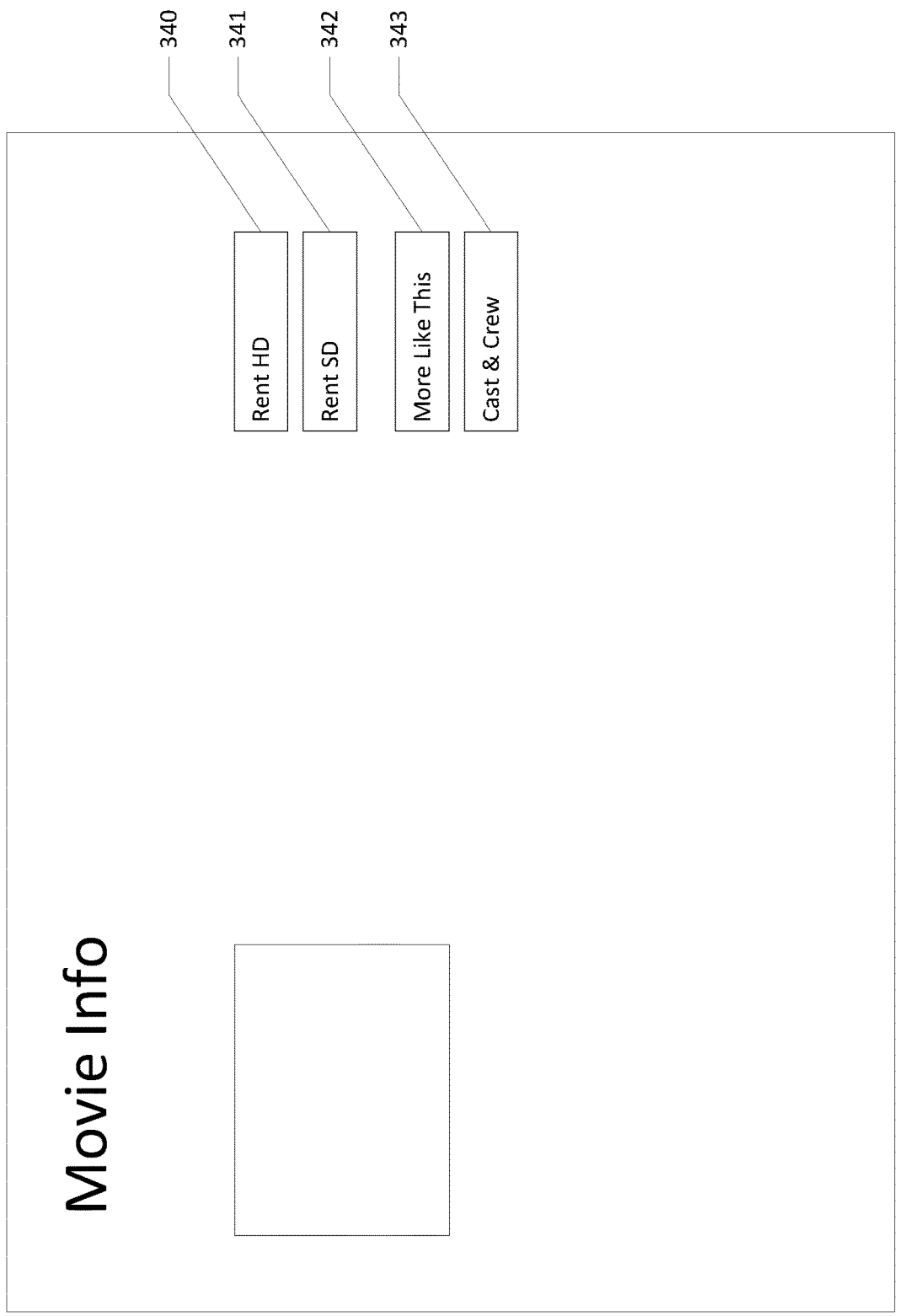

FIG. 3C shows the user highlighting one of the "Just In" movies 320, and the announcement may say the following: "Voice guided navigation on. Press the Menu button to access the Main Menu. Press the Last button to return to the previous screen. Press the 0 button to learn your remote. Press arrow keys to review the screen, then press OK to select. On Demand, Movies, Just In, <Movie Title>." Should the user request to see a description of the selected movie, then in FIG. 3D, the user may see the description 330 appear, and may hear an announcement of the selected movie's description (e.g., "Movie about a boy and his dog, running time 90 minutes, starring actor 1"). FIG. 3E shows an example detail screen for a movie, with user-selectable options to rent high definition 340 or standard definition 341 versions of the movie, or to request 342 to see a listing of movies that are similar to the movie detailed on the screen, or to see additional information 343 regarding the cast or crew of the movie.

As is evident from the above examples, the annunciation need not be a literal reading aloud of the corresponding text. Some annunciations may be shorter than a straight reading by omitting words or rephrasing the text to facilitate quick navigation. Other annunciations may be longer to provide additional detail that may be helpful to the user (e.g., if the user is identified as a novice to the interface 300, and could need additional instruction on using the interface). In some embodiments, text-to-speech (TTS) metadata may be used to identify simplified or alternative annunciations of corresponding text.

Audio files may be played even when there is no corresponding textual item. For example, the first screen of the interface may be associated with a welcome audio file to be played when the user first enters the interface. For example, upon opening interface 300, an audio file may be played, informing the user of where they are in the interface, and giving instructions for using the interface: "Welcome to the guide. To continue with voice-guided navigation, press the 'D' button, located above the number '3' button of your remote." Other screens in the interface may be associated with their own audio files, and similar announcements may be played as the user navigates to different screens or pages in the interface. To support these features, the interface items needing voice announcement may include, in the interface metadata, announcement text serving as a script for the desired announcement. In some embodiments, the various audio files may be stored locally by the user's computing device to allow offline access to the audio annunciations.

The following tables illustrate examples of voice announcements ("Voice Out") that may be read aloud in association with different user activities in the interface (the brackets < > are used to refer to data that may vary depending on the context of the announcement):

| Description | Voice out |
|---|---|
| When user launches the App, Welcome screen Appears, an on-screen pop-up appears containing the text shown as Voice Out in the cell to the right. The pop-up disappears as soon as the Voice out is complete and the user is taken to the Main Menu. | Welcome to your interface. To continue with voice-guided navigation, press the D button, located above the number 3 button of your Remote. |
| If user pressed D button (enabled voice-guided navigation) while still in Welcome screen. | Voice-guided navigation is On. Press the 0 key to learn the buttons on your Remote. Main Menu <Name of menu item with focus> button, n of 5 (e.g. Guide button, 1 of 5). Press arrow keys to review the screen, then press OK to select. Press Menu button to access the Main Menu and the Last button to return to the previous screen. |
| User navigating right or left to other menu items in Main menu. | <Name of menu item with focus> button, n of 5. |
| User navigating Up and Down keys | <Audio tune> <Name of menu item with focus> button, n of 5. |
| User presses 0 key and then any key on the remote control to hear its name and optionally its function | <Name of key> key, optionally function of key |

The table below illustrates example voice announcements in response to the user selecting a Guide 301 option in the interface:

| Description | Voice out |
|---|---|
| When user enters the Guide either by pressing OK when focus is on the Guide button in the main menu, or by pressing the Guide button. | When user enters the Grid Guide for the very first time, voice out: Content Listings, now showing on <Network Name of Service or Channel (if available)>, Channel Number <Channel Number>, <Call Letters for Channel>, <Program Title>, time remaining xx minutes. Press Up and Down to move between Channels, Right and Left to review programs for a channel. For all subsequent entries into the Guide, the voice out may be shortened to remove navigation instructions: Content Listings, now showing on <Network Name of Channel (if available)>, Channel Number <Channel Number>, <Call Letters for Channel>, <Program Title>, time remaining xx minutes. |
| When user navigates up or down in the left-most time slot | <Network Name of Channel (if available)>, Channel Number <Channel Number>, <Call Letters for Channel> <Program Title> , time remaining xx minutes |
| When user navigates right, for each program with focus whose start time is in the current day | <Program Start Time am or pm>, <Program Title>, <duration> minutes. |
| For each of the next 6 days of the week, the first program whose start time is on a new day (that is the first program on the new day of week with start time of 12:00 or later) (For example, if today is Monday, this rule applies to the first complete program on Tuesday, Wednesday, Thursday, Friday, Saturday and Sunday. Starting with next Monday, a different rule applies). | <Program Start Day of week and Time, am or pm>, <Program Title>, <duration> minutes |
| For each day which is more than 6 days into the future, (e.g. if today is Monday, starting with next Monday), the first program which is wholly within the new day | <Program Start Month, Date, Time am or pm>, <Program Title>, <duration> minutes. |

-continued

| Description | Voice out |
|---|---|
| For each program which starts on a future day and is not the first program wholly within that day | <Program Start Time am or pm>, <Program Title>, <duration> minutes. |
| When user presses OK key on a program with focus in the Guide, display pop-up text identical to voice out (this is just for the prototype as a real product would tune to a program (only) if it is currently playing. | Tuned to <name of program>. Press Menu button to return to Main Menu. |

References to "channel" herein may refer to a content service (e.g., video on demand provider, music provider, software provider, etc.), a television network (e.g., NBC, CBS, ABC), or any other source of content that may be offered in the interface 300.

The table below illustrates example voice announcements that may be made if the user chooses the On Demand option in the interface 300:

| Description | Voice out |
|---|---|
| When user enters the On Demand menu by pressing OK when focus is on the On Demand button in the main menu | On Demand Categories List, Movies button, 1 of 10. Press arrow keys to review the screen, then press OK to select. |
| When user navigates up or down in the Categories List | <Category> button n of 10 (e.g. TV Shows button 2 of 10) |
| When there is a list of sub-categories associated with a category and that list is displayed to the right of the Categories List followed by a selected list of titles in rows, one row for each sub-category and user presses right arrow to focus on a sub-category | <Category> categories list, <Sub-category> button, n of M (e.g. Movies categories list, Just In button, 1 of 14) |
| User Navigation within sub-category level by pressing up or down arrow buttons | <Sub-category> button n of M |
| Navigation within the one row of selected titles to the right of sub-categories list. | <Sub-Category> <Name of Title> 1 of N, <number of stars> stars, release year <release year>, From X Dollars and Y Cents (note if free, should say Watch Free), <number of minutes> minutes, (if HD) HD program , TV Rating <Rating>, New Arrival or Ends <Month><Date> <Description> |
| Navigation within a rectangular grid of titles/programs | When navigating a grid of titles/programs, the system may voice out the row and column identifiers for the first title with focus (first row and first column) as follows: Row 1 of N, Column 1 of M. The values N and M may be based on the total number of titles/programs available. The full Row identifier (i.e., Row x of N) may be used with each navigation announcement, or only when the Row number changes (e.g., the user navigates to a different row). The full Column identifier (Column y of M) may also be used with each navigation announcement, or only when the Column number changes. As the user navigates from one column to another along the same Row, the format may be Row x, Column y of M, Row x, Column y + 1 of M and so on. As the user navigates from one row to another along the same Column, the format may be Row x of N, column y, Row x + 1 of N, column y and so on. The voice out for the first title with focus may be: <Sub-Category> <Name of Title> row 1 of M, column 1 of N, <number of stars> stars, release year <release year>, From X |

-continued

| Description | Voice out |
|---|---|
| | Dollars and Y Cents, <number of minutes> minutes, HD (if in HD), TV Rating <Rating>, New Arrival or Ends <Month><Date> <Description> As user navigates along row x, format may be: <Sub-Category> <Name of Title> row x column y of N, <number of stars> stars, release year <release year>, From X Dollars and Y Cents, <number of minutes> minutes, HD (if in HD), TV Rating <Rating>, New Arrival or Ends <Month><Date> <Description> As user navigates along column y, the format may be: <Sub-Category> <Name of Title> row x of M column y, <number of stars> stars, release year <release year>, From X Dollars and Y Cents, <number of minutes> minutes, HD (if in HD), TV Rating <Rating>, New Arrival or Ends <Month><Date> <Description> |
| Rectangular grid bounded on all sides (Left arrow button is "no action" and Last button takes user back to the sub-category corresponding to the grid. | Left arrow button is "no action" and audio tone sounds when user tries to navigate outward from the titles on the edge of the rectangular grid. |
| Vertical List of titles for a sub-category (e.g. Free Previews under Movies) | <Sub-Category> <Name of Title> 1 of N, <number of stars> stars, release year <release year>, Watch Free, <number of minutes> minutes, (if HD) HD program, TV Rating <Rating>, New Arrival or Ends <Month><Date> <Description> |
| User presses OK button while focus is on a title to go to Movie Info screen where focus will be on Rent (or Watch) button | Movies Movie Info for <Name of Title> Rent button, 1 of N, press arrow keys to review the screen, then press OK to select. <number of stars> stars, release year <release year>, From X Dollars and Y Cents (note if free, should say Watch Free), <number of minutes> minutes, (if HD) HD program , TV Rating <Rating>, New Arrival or Ends <Month><Date> <Description> |
| When focus is on Rent button, left, right and up arrow keys are pressed and result in "no action" | Audio tone sounds and voice out the text for Rent button |
| Within Movie Info screen, user navigates to More Like This button. | More Like <Name of Title> button 2 of N. Press OK to select. |
| Within Movie Info screen, user navigates to Cast & Crew button | <Name of title> cast and crew button 3 of N. Press Ok to select. |
| When focus is on Rent, More Like This or cast & Crew buttons, left, and right and up arrow keys result in "no action" | Audio tone sounds and voice out the text for the button with focus. |
| When user returns to Rent button either from the More Like This button by pressing Up Arrow or from Cancel button by pressing OK | Rent <Name of title> button 1 of N, press OK to rent <Name of title> |
| More Like: <Name of Title> Screen When focus is on More Like This and user presses OK button, More Like: <Name of title> screen appears with focus on first title in a vertical list | More Like <Name of title> <Name of More Like Title> 1 of N, press arrow keys to review the screen then press OK to select. <number of stars> stars, release year <release year>, From X Dollars and Y Cents (note if free, should say Watch Free), <number of minutes> minutes, (if HD) HD program , TV Rating <Rating>, New Arrival or Ends <Month><Date> <Description> |
| More Like: <Name of Title> Screen In More Like: <name of Title> screen, user navigates down and up the list of titles which are more like <name of title>. For each title, including the first one in list when user returns to it | <Name of More Like Title> x of N, press arrow keys to review the screen then press OK to select. <number of stars> stars, release year <release year>, From X Dollars and Y Cents (note if free, should say Watch Free), <number of minutes> minutes, (if HD) HD program , TV Rating <Rating>, New Arrival or Ends <Month><Date> <Description> |

-continued

| Description | Voice out |
|---|---|
| Cast & Crew: <Name of Title> Screen When focus is on Cast & Crew and user presses OK button, Cast & Crew: <Name of title> screen appears with focus on first actor in a vertical list. | Cast and Crew for <Name of Title> <Name of first actor in list> 1 of N, press up and down arrow buttons for other actors. Press OK to return to Movie Info to access a list of other titles showing the actor <Actor information> |
| Left and right arrow buttons are "no action" buttons in More Like and Cast & Crew screens. Last key brings user back to previous screen. | Audio tone and voice out for focused element |
| Person Info Screen User presses OK with focus on <Actor> in list of actors on Cast & Crew screen and is taken to Person Info screen for <Actor> with focus on "Now Showing In" button. | For titles now showing <Actor>, press OK to select. <Actor detailed information> |
| Person Info Screen Up, Down, Left and Right buttons are "no action" in Person Info Screen. | Audio tone sounds and voice out for focused element, namely "Now Showing In" |
| Now Showing <Actor> Screen User presses OK with focus on "Now Showing In" in Person Info screen and is taken to Now Showing <Actor> Screen with focus on first title in a vertical list of titles. | Now Showing: <Actor> <Name of first Title> 1 of N, press arrow keys to review the screen, then press OK to select. <title description> |
| Now Showing <Actor> Screen Right and Left Arrow buttons are "no action" | Audio tone and voice out for selected title |
| Rent button when title is available in HD and SD User presses OK while focus is on Rent button in Movie Info screen and Rent On Demand popup appears with focus on "HD $X.YZ" button. User can either navigate down to next button (SD price) or press OK to rent the title in HD. When user continues down to SD $Xs.YsZs button | Rent <Name of Title> in HD for $X.YZ |
| Rent button when title is available in HD and SD When user continues down to next button "SD $Xs.YsZs" | Rent <Name of Title> in SD for $Xs.YsZs |
| Rent button when title is available in HD and SD When user continues down to next button "Cancel". If user presses OK on cancel, he/she is taken back to Rent button | Press OK to cancel |
| Rent button when title is available in SD only User presses OK while focus is on Rent button in Movie Info screen and Rent On Demand pop up appears with text in it containing SD price and End Date and two buttons namely Cancel and Rent. Focus is on Cancel. Pressing OK on Cancel takes user back to Rent button in Movie Info Screen. | Rent <Name of Title> in SD for $Xs.YsZs, available until <End Date> |
| Rent button when title is available in SD only With focus on Cancel button in pop up, user presses Right Arrow to take him/her to Rent button within pop up. | Press OK to Rent <Name of Title> |
| Watch button is used instead of Rent button for some titles. Use same voice out as for Rent button. Note that for some titles, pressing Watch button initiates playback of the title. | Same as for Rent button, except that for some titles, initiates title playback |
| When user presses the final "Rent" or "Watch" button which is meant to launch the video | Thank you for ordering <Name of Title> in case of Rent and Thank you for watching <Name of Title> in case of Watch. OK to not launch video. |

-continued

| Description | Voice out |
|---|---|
| TV Shows Series Info<br>Pressing OK on titles for TV Shows leads user to TV Shows Series Info screen which has Episodes button.<br>Episodes: <Name of Title> Screen<br>Pressing OK with focus on Episodes button leads to first Episode in a list of Episodes for a Season No. There may be other Season Nos listed as well. | TV Shows Series Info for <Name of Title> Episodes button 1 of N, press arrow keys to review the screen then press OK to select <Description of title><br>TBD |

In some embodiments, a set of explanatory announcements may be used the first time the user uses the voice navigation mode. Such a beginner's mode may be used once and skipped in future uses, or it may be used as long as the user sets the system to be in the beginner's mode.

The table below illustrates some examples of the additional announcements that may be made:

| Screen in which voice-guided navigation is initially turned on | Voice out |
|---|---|
| Main menu button | Voice guided navigation on. Press the Menu button to access the Main Menu. Press the Last button to return to the previous screen. Press the 0 button to learn your remote. Main Menu <Name of button> button, n of 5. Press arrow keys to review the screen, then press OK to select. |
| On Demand Category button | Voice guided navigation on. Press the Menu button to access the Main Menu. Press the Last button to return to the previous screen. Press the 0 button to learn your remote. On Demand Categories List <Name of category> button n of 11. Press arrow keys to review the screen, then press OK to select |
| On Demand Sub-Category button | Voice guided navigation on. Press the Menu button to access the Main Menu. Press the Last button to return to the previous screen. Press the 0 button to learn your remote. Press arrow keys to review the screen, then press OK to select. On Demand <Name of category> categories list, <Name of sub-category> button n of 11. |
| On Demand Title | Voice guided navigation on. Press the Menu button to access the Main Menu. Press the Last button to return to the previous screen. Press the 0 button to learn your remote. Press arrow keys to review the screen, then press OK to select. On Demand <Name of category> <Name of sub-category> <name of title> and rest of usual text. |
| Movie Info Screen Rent button | Voice guided navigation on. Press the Menu button to access the Main Menu. Press the Last button to return to the previous screen. Press the 0 button to learn your remote. Press arrow keys to review the screen, then press OK to select. On Demand Movie Info for<name of title> Rent button 1 of n and rest of usual text |
| Movie Info Screen More Like This button | Voice guided navigation on. Press the Menu button to access the Main Menu. Press the Last button to return to the previous screen. Press the 0 button to learn your remote. Press arrow keys to review the screen, then press OK to select. On Demand Movie Info More Like <name of title> button 2 of n and rest of usual text |

| Screen in which voice-guided navigation is initially turned on | Voice out |
| --- | --- |
| Movie Info Screen Cast & Crew button | Voice guided navigation on. Press the Menu button to access the Main Menu. Press the Last button to return to the previous screen. Press the 0 button to learn your remote. Press arrow keys to review the screen, then press OK to select. On Demand Movie Info <name of title> Cast and crew, button 3 of n and rest of usual text |
| Guide with focus on a program | Voice guided navigation on. Press the Menu button to access the Main Menu. Press the Last button to return to the previous screen. Press the 0 button to learn your remote. Press arrow keys to review the screen, then press OK to select. Remaining text is as follows: If program is in currently playing time slot: Content Listings, <Network Name of Channel (if available)>, Channel Number <Channel Number>, <Call Letters for Channel>, now playing <Program Title>, time remaining xx minutes. If program is today but not in currently playing time slot: Content Listings, <Network Name of Channel (if available)>, Channel Number <Channel Number>, <Call Letters for Channel> <Start Time> <Program Title>, duration xx minutes. If program is on a future day which is not more than 6 days into the future: Content Listings, <Network Name of Channel (if available)>, Channel Number <Channel Number>, <Call Letters for Channel > <Day of week> <Start Time> <Program Title>, duration xx minutes. If program is on a future day which is more than 6 days into the future: Content Listings, <Network Name of Channel (if available)>, Channel Number <Channel Number>, <Call Letters for Channel> <Month> <Date> <Start Time> <Program Title>, duration xx minutes. |

In some embodiments, and as mentioned in the tables above, the user may choose to enter into a learning mode by pressing a predetermined button on the remote, such as a zero ('0') button at the main screen. In the learning mode, pressing buttons on the remote can result in an explanatory announcement of the various functions of that button in the different interface screens.

The tables above are merely examples of an interface's behavior. The various features may be rearranged and omitted as desired, and additional features and text items with announcements may be used.

Figure 4:
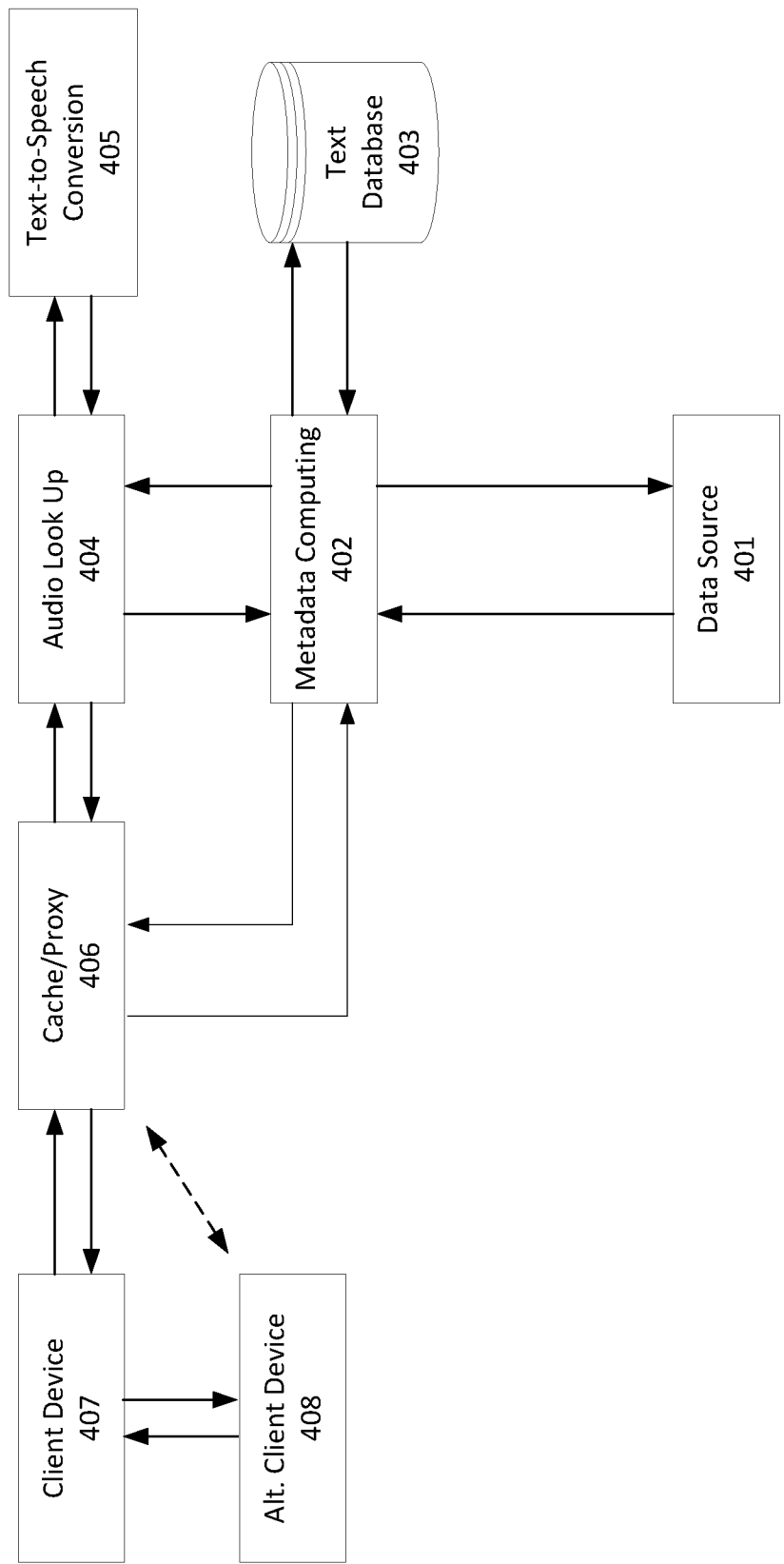
FIG. 4 illustrates an example architecture on which features described herein may be practiced.

FIG. 4 illustrates an example architecture that may be used to provide the features described herein. Any of the various components may be implemented, for example using the computing device shown in FIG. 2, and the various components or functionalities may be combined, rearranged or subdivided as desired for a particular implementation. The FIG. 4 system may include one or more data sources 401. The data source 401 may be a computing device that generates and delivers the various interface data screens, images, etc., and their content, that a user may view. The data source 401 may be implemented and/or operated by a content creator, provider, or a third party. These screens may be delivered in any format, e.g., in HTML format for Internet access, and may include various textual items that are to appear on the user's screen. In some embodiments, the data may be organized using JavaScript Object Notation (JSON) structure, and may be updated periodically by the source 401. For example, the source 401 may provide program guide data for upcoming scheduled transmissions of video programs (e.g., a television schedule, video on demand library, etc.), and the data may be updated to reflect the passage of time and to add newer listings. The metadata may also include additional information related to text corresponding to announcements that are to be heard, but not seen, when the screen is displayed or when the user highlights a corresponding portion of the screen, as described in the tables above.

Each textual or graphical item on the screen may be associated, in the HTML metadata, with a unique voice announcement identifier. For example, the program label "Deadliest Catch: Season 3 Recap" may be associated with a voice announcement identifier "12345." The voice announcement identifier may be created and assigned, e.g., by the data source 401 when the interface screen is created, and voice announcement identifiers may be assigned to all of the textual or graphical items appearing in the interface. The kinds of textual items may include, for example, menu structure folder names (e.g., top level menu items), sub-folder names (e.g., sub-menu items), network names, movie names, rating, price and description of movies, cast and crew names and descriptions, names of series, episodes, program names, start times, duration, channel name, call letters, graphical shapes or identifiers, etc. Text is used as an example above, but graphical onscreen elements may also have their own announcements. For example, an onscreen logo for a content provider (e.g., the NBC peacock logo) may be announced as "NBC," and other marks and graphics may have their own voice announcement.

To support the announcements that do not correspond to onscreen text elements (e.g., an announcement that is played when an interface screen is first displayed, even prior to the user highlighting an element on the screen), the screens themselves, or the HTML pages, may also be associated with a voice announcement identifier. For such unseen text, the data for the screens may include, as undisplayed metadata, textual phrases for the corresponding announcement that is to be played.

The system may also include a metadata computing device 402. The metadata computing device 402, e.g., a server, may be responsible for ensuring that the various voice announcement identifiers in the interface, and their corresponding announcement text, have corresponding announcement audio files. The metadata server 402 may maintain a text database 403, storing all of the various textual items in the interface, along with their corresponding voice announcement identifiers and, if desired, copies of their corresponding audio files. The metadata server 402 may also maintain a listing of the various voice announcement identifiers, other (e.g., third party) text databases, and a corresponding indication of whether and where an audio file exists for each voice announcement identifier. For example, the text database 403 may store entries as follows:

| Voice Announcement Identifier | Text | Audio File? | Audio File Location |
|---|---|---|---|
| 12345 | Deadliest Catch Season 3 Recap | Y | URL/42a342bc3.mp3 |
| 12346 | Planet 51 | Y | URL/2397ddd52.mp3 |
| 24523 | Weather | Y | URL/235988213.mp3 |
| 23495 | Sports Center | N | |

As illustrated in the example above, the first three voice announcement identifiers have corresponding audio files that may be stored at a location having the URL addresses and file names listed. The fourth entry, however, may be for a textual item that has not yet been processed for audio. This may occur, for example, as the scheduled transmission guide (e.g., an EPG of upcoming scheduled television program transmissions) is updated over time, and new programs appear on the schedule. The "SportsCenter" program may be newly added to the guide offered by the data source 401 to users, and might not have an associated audio file when it is first made available. The algorithms described further below illustrate examples of how such new textual items may be identified and processed to generate a corresponding audio file.

As noted above, there may be multiple versions of audio files corresponding to a single textual item. The text database 403 may account for these versions as well. For example, the "Deadliest Catch Season 3 Recap" text above may actually have multiple voice announcement identifiers, such as the following:

| Voice Announcement Identifier | Text | Audio File? | Audio File Location |
|---|---|---|---|
| 12345 | Deadliest Catch Season 3 Recap | Y | URL/42a342bc3.mp3 |
| 12350 | Deadliest Catch Season 3 Recap (read at 1.5x speed) | Y | URL/2394ddd52.mp3 |
| 24551 | Deadliest Catch Season 3 Recap (read at 0.5x speed) | Y | URL/235588213.mp3 |
| 23452 | Deadliest Catch S 3 | N | URL/2355c8213.mp3 |

Returning to the architecture in FIG. 4, the system may include an audio look up computing device 404. The look up computing device may help coordinate the generation of audio files from text, and may serve as an intermediary between the metadata server 402 and a text-to-speech conversion computing device 405. The text-to-speech conversion computing device 405 may receive text and process it to generate an audio file of a simulated voice reading the text. For example, the text-to-speech conversion computing device 405 may be a Nuance Text-to-Voice server, from Nuance Communications, Inc. The look up computing device 404 may also interface with cache 406 which may also function as a proxy in a particular architecture, which may be a computing device that offers the data source 401's interface to one or more user devices 407 (e.g., a tablet computer) or alternate user devices 408 (e.g., a smart phone) used by a user sitting in a room in which an HDTV is used to navigate the interface. For example, the cache 406 may be a proxy server offering a URL for particular interface, and servicing requests from user for the interface's pages. In some embodiments, user inputs at the client device 407 are provided to a browser application on the client device 407, and then transferred to the cache 406, which may maintain a stateful server tracking the user's interaction with the interface and responding to the user inputs. The behavior of these various hardware elements will be described in greater detail below, in conjunction with the algorithms shown in FIGS. 5A-B.

Figure 5A:
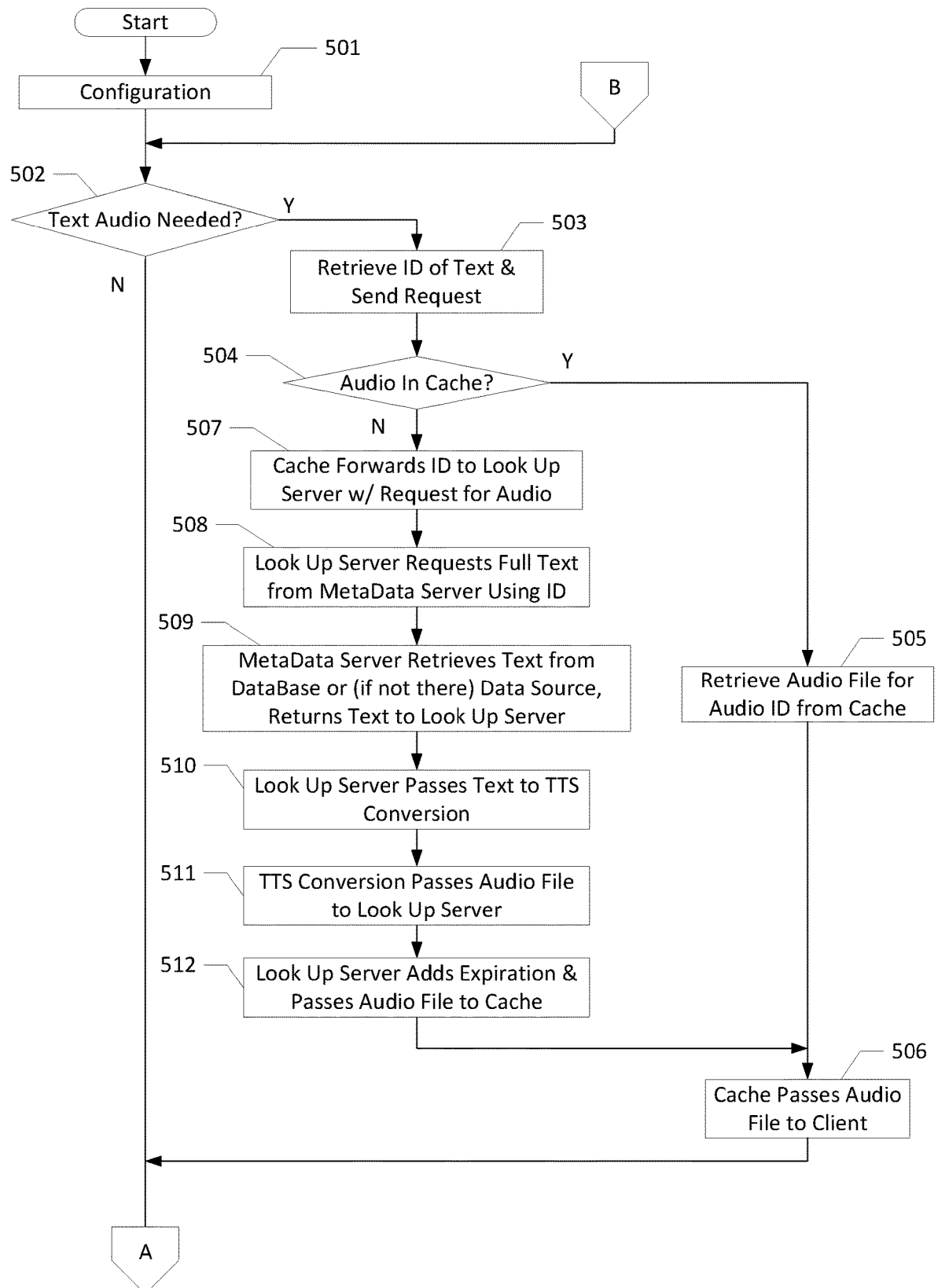
FIGS. 5A-B illustrate example methods and algorithms for implementing some of the features described herein.

FIG. 5A illustrates an example method and/or algorithm for implementing various features of the disclosure. Various steps may be performed by the various components in the system shown in FIG. 4. In step 501, the various hardware and software components in the system may be configured for operation. Configuration may entail different actions for the components. Configuring the data source 401 may involve creating the code (e.g. HTML code) for the interface 300 and its various screen display elements and navigational options. This may include creating metadata for the various textual and graphical items on the interface screens, and assign to them a corresponding voice announcement identifier. For announcements corresponding to unseen text, metadata can be created corresponding to the text that is to be read aloud for the voice announcement.

Configuring the metadata computing device 402 may involve providing it with the address (e.g., a URL) for the one or more data sources 401. The metadata computing device 402 may access this address and retrieve the initial version of the interface, and process the data to identify the various voice announcement identifiers. The metadata computing device 402 may store data (e.g., in table form) in the text database 403 with the voice announcement identifiers, corresponding text, and other audio file information, e.g., as discussed above. In some embodiments, the audio files may be provided initially with the interface from the data source 401 (e.g., the user creating the interface may provide default audio files for interface elements such as the "Go To" button).

Configuring the audio look up device 404 may involve providing it with an application program interface (API) to access the text-to-speech conversion device 405. This API may inform the audio look up device 404 with the manner in which it is to supply text to the text-to-speech conversion device 405, and the manner in which it will receive a corresponding audio file for the supplied text.

Configuring the cache 406 may entail loading it with the code (e.g., HTML code) for the interface from the data source 401. The cache may be an Internet server, and may expose an interface site to users.

Configuring the user devices (e.g. client devices) may entail simply using a network browser (e.g., an Internet browser) to navigate to the network site offered by the cache 406. In some embodiments, this configuration of the device 407 may include requesting a user to indicate his/her level of experience in using the interface's voice navigation features. Different types of audio files may be provided to support different levels of user experience, so while a novice user may receive an audio file in which a highlighted item is announced with detailed instructions on how to proceed with selecting the highlighted item (e.g., "You've selected Movie 1. Press OK to view this item"), a more experienced user may simply receive an audio file announcing the highlighted item, without the additional instruction. ("e.g., You've selected Movie 1."). Some users may also request that their announcements be read aloud faster, while others prefer a slower reading. For example, users for whom English is a new language may need a slower reading, while experienced English speakers may prefer to have the voice read the content quickly. The textual items in the interface may be associated with multiple voice announcement identifiers, corresponding to a variety of different versions of audio files for the same textual item, to support these various user preferences. As requests for audio are received, the cache may use HTTP 301 Redirect commands, for example, to route client requests to an appropriate server providing the requested type of audio file.

In some embodiments, there may be multiple users in a room, with the interface being displayed on a main screen (e.g., the wall-mounted HD display in a family room), and the user may wish to receive the audio announcements on a different device. For example, the user may wish to have the audio announcements sent to his smart phone, so he can listen to the announcements on headphones without disturbing the others in the room, who may be listening to the primary audio on the main screen (e.g., if an EPG allows the currently-tuned program to be presented in a picture-in-picture window, then the audio for that currently-tuned program may be played from the main screen's associated speakers, while the EPG announcement audio may be delivered to the user's smart phone). In such an embodiment, the configuration of the devices 407/408 may include the alternative user or client device 408 establishing a communication link with the client device 407 (e.g., a wireless link using a premise's wi-fi network), and requesting that the client device 407 redirect audio files to the alternative client device 408 for playback. Or, as another alternative, the alternative client device 408 may provide the client device 407 with information identifying how audio files may be delivered to the device 408 (e.g., by providing an Internet Protocol address for the device 408, or identifying a reserved downstream channel received by the device 408), and when the client device 407 requests audio files from the cache 406 (as will be described below), it can indicate to the cache 406 a destination address or channel to which the audio files should be delivered so that they may be received by the alternative client device 408. So in operation, the client device 407 may transmit a request to retrieve a new portion of data from the interface, and to have visual and textual portions of the new portion delivered to the requesting client device 407, and a request to have audio files corresponding to the textual portions delivered to a different device from the client device 407. In some embodiments, multiple users in the room may each have their own alternate device 408, and may each request to receive different audio files in response to a selection of a textual item on the interface by a user of the primary client device 407. For example, one user may wish to have a slower reading of the announcement, while another user may wish to have a quicker reading, or may request to skip predetermined words or portions of words in the reading.

In some embodiments, the strength of a data connection between the client device 407 and the cache 406 may also assist in the configuration of the system. For example, a weaker data connection may favor delivery of smaller files, and as such, shorter versions of audio files may be preferred. Conversely, a strong data connection may allow greater confidence in delivery of larger audio files, so larger files may be used.

In step 502, the device 407 may determine whether an audio announcement of text is needed. The device 407 may make this determination by detecting a user navigation input on the device 407 (e.g., the user presses the left direction arrow to select a different program in a grid guide), and determining whether a resulting displayed screen or highlighted element includes a voice announcement identifier as part of the interface's metadata. If a voice announcement identifier is associated with a newly-highlighted item, or if a voice announcement identifier is associated with a new page displayed as a result of the user navigation input, then in step 503, the device 407 may retrieve the voice announcement identifier for the newly-highlighted item or newly-displayed page.

As part of retrieving the voice announcement identifier, the device 407 may consult the metadata for the interface to determine whether any announcement rules should be applied for the audio announcement. The announcement rules may call for different voice announcements for the same textual item on the interface, or the same interface screen. For example, one announcement rule may be based on the user's experience level with the voice navigation, as noted above. There may be an "Expert" level audio file for a textual item, and a "Beginner" level audio file for the textual item. The interface's metadata may identify two different voice announcement identifiers, one for Expert and one for Beginner.

The level of expertise is not the only way in which a voice announcement may vary. User preferences for male/female voices, interface rules regarding repeated highlighting of the same textual item or interface element (e.g., visiting the same menu item a second time may result in a slightly different audio announcement, perhaps omitting an instructional message that was played the first time, as illustrated in the example tables above), and various other criteria may affect the ultimate choice of the audio for playback. Accordingly, the interface's metadata may include multiple voice announcement identifiers for the same textual item, with various rules and criteria to be satisfied for each one to be chosen. As part of retrieving the voice announcement identifier in step 503, the device 407 may consult the metadata, apply any associated criteria, and select the voice announcement identifier that best matches the criteria. The device 407 may then transmit a request to the cache 406.

The request may include the retrieved voice announcement identifier, and may request that the cache 406 provide the device 407 with an audio file that corresponds to the voice announcement identifier. An example request may be an HTTP GET request, containing the voice announcement identifier of the highlighted text item currently displayed in the interface. In some situations, the corresponding audio file may already have been provided to the device 407 (e.g., if the user had previously navigated to the same item, and the interface's voice announcement rules call for playing the same audio), and in those situations the device 407 may simply replay that audio file without need for the cache request.

In step 504, the cache, or any other suitable storage device, may determine whether it stores a copy of the audio file that corresponds to the voice announcement identifier contained in the request. If it does store a copy, the cache may also determine whether the copy has expired. This determination may be made by comparing an expiration date and time associated with the stored audio file with the current date and time. If the cache contains an unexpired copy of the audio file corresponding to the voice announcement identifier from the request, then in step 505 the cache 406 may retrieve the audio file, and deliver it in step 506 to the requesting client 407 in response to the client 407's request.

If the cache 406 did not contain an unexpired copy of the audio file, then in step 507, the cache 406 may send a request to the look up device 404, to initiate a process of generating the desired audio file. The request may include the voice announcement identifier retrieved in step 503.

In step 508, the look up device 404 may transmit a request to the metadata computing device 402, to request the announcement text that corresponds with the voice announcement identifier. As noted above, the announcement text may be the textual script for the voice announcement that should be played for the user. FIG. 5A shows the look up device 404 requesting this announcement text from the metadata computing device 402, but in alternative embodiments, the announcement text may be provided to the look up device 404 from the cache 406 as part of the request sent in step 507. The cache 406 may possess the announcement text as part of the interface metadata that it receives from the source 401.

In step 509, the metadata computing device 402 may receive the request from the look up device 404, and may consult the text database 403 to retrieve the announcement text that corresponds to the voice announcement identifier included in the request from the look up device 404. If the announcement text is not found in the text database 403 (e.g., the metadata device 402 has not yet updated its copy of the interface to the most recent copy), then the metadata device 402 may send a request to the source 401 to retrieve that text. The metadata device 402 may then provide the announcement text to the look up device 404 in response to its request.

In step 510, the look up device 404 may then transmit the announcement text to the text-to-speech conversion device 405, requesting a corresponding audio file. This may be, for example, and HTTP POST request. In step 511, the text-to-speech conversion device 405 processes the announcement text and generates an audio file of a computer-simulated voice reading the announcement text, and provides this audio file to the look up device 404 in response to the look up device's request.

In step 512, the look up device assigns an expiration date and time to the audio file it received from the text-to-speech converter, and supplies the audio file with the expiration date and time to the cache 406. The expiration data may be included as part of a response header containing the audio file. The cache 406 updates its own storage to store a copy of the audio file, and updates its own records indicating when the new audio file will expire. The cache then, in step 506, supplies the audio file to the client 407. The cache 406 may also send a response, such as an HTTP 200 OK response, to the metadata computing device 402, to inform it that the audio file has been added to the cache. The metadata computing device 402 may update its own records to indicate that the voice announcement identifier now has an associated audio file. In some embodiments, the metadata computing device 402 may receive a copy of the audio file from the cache 406 (or from the look up device 404), and may store the audio file in the database 403. Alternatively, the metadata computing device may receive an address for the audio file from the cache 406, and may store this address information for future reference. The audio file may also be propagated to other storage devices, such as a computing storage device in a content delivery network, to serve as an alternative source should the cache become unavailable. In such an alternate embodiment, the requests to the cache may be redirected to the content delivery network storage device when the cache has become unavailable.

Figure 5B:
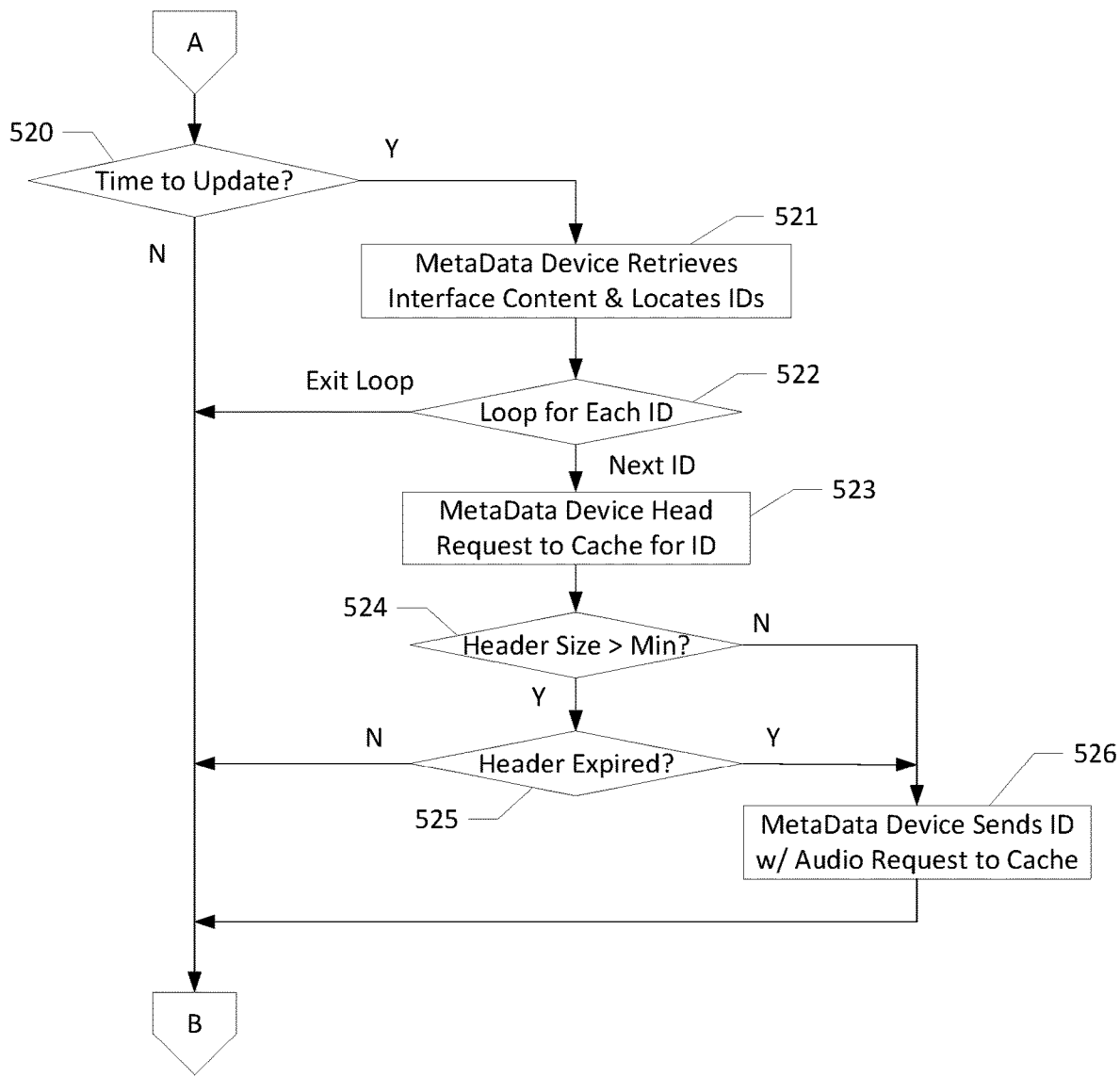

FIG. 5B illustrates a looping process by which the metadata device 402 seeks to ensure that the cache 406 contains audio files for all of the voice announcement identifiers in the current version of the interface offered by the source 401. To do this, in step 520, the metadata computing device 402 may determine whether it is time to do an update check of the interface's voice announcement data. The update check may be periodically performed, such as once every hour, and the metadata computing device 402 may maintain a timer to determine when another check is needed.

If no check is needed, then the process can return to step 502. However, if a check is needed, then in step 521, the metadata computing device may transmit a request to the cache 406, requesting a current copy of the interface's content. The metadata device may consult the retrieved copy of the interface's content to identify all of its voice announcement identifiers, and it may then begin a loop 522 for each announcement identifier. In some embodiments, the metadata device 402 may maintain a record of which voice announcement identifiers have a corresponding audio file, as well as information identifying where the audio files are stored, when they expire, and even copies of the audio files themselves. In selecting voice announcement identifiers for loop 522, the metadata device 402 may first eliminate from selection any voice announcement identifier for which it already knows there exists an unexpired audio file.

For each voice announcement identifier, the metadata device 402 may transmit a request to the cache 406 for the voice announcement identifier's corresponding audio file. The request may be a normal request for the audio file, although in some embodiments, the request may simply request header information for the audio file. For example, the request may be an HTTP HEAD request for the audio file. Such a request may result in a response from the cache containing basic information about the requested audio file. The basic information may include size and expiration date information for the requested audio file. If the cache does not store an audio file for the voice announcement identifier, it will still store some information, such as placeholder information, corresponding to the voice announcement identifier, because the identifier is part of the interface's metadata files. That metadata may still be responsive to the header request, but it will be much smaller than a normal audio file.

In step 524, the metadata device may determine whether the returned size value exceeds a predetermined minimum size value. The minimum size value may be any size value selected to indicate the lack of an actual audio file. For example, if the cache only has placeholder information corresponding to the voice announcement identifier, and no actual audio file, then the size of the placeholder information will be much smaller than an actual audio file, and in many cases would simply be a zero size return value. This small size may indicate to the metadata device that the cache does not truly have a full audio file for the corresponding voice announcement identifier. An example minimum may be 1 Kb.

If the header response size is greater than this minimum, then the metadata device 402 may infer that the cache has an audio file corresponding to the voice announcement identifier, and may proceed to step 525 to determine whether the header expiration date (and/or time) from the cache's response is expired. This can be done by comparing the expiration date in the header against the current date. If the header has not expired, then the metadata device 402 can infer that the cache has a current, unexpired copy of the audio file for the voice announcement identifier, and may return to step 522 to process the next voice announcement identifier.

However, if the header size was below the predetermined minimum in step 524, or if the header has expired in step 525, then the metadata device may proceed to step 526. In step 526, the metadata device can transmit a normal request (e.g., an HTTP GET request, as opposed to the HEAD request sent in step 523) to the cache for the audio file. The request can identify the voice announcement identifier, in the same manner as the one sent in step 503 by the client device 407. That request would then be handed according to the steps 504 et seq. above, with the end result being a copy of the audio file added to the cache 406.

Other features may be implemented as well. For example, the playback of a voice announcement may be interrupted at the client device if the user enters another user input before the voice announcement is completed. In such an embodiment, when the client device 407 detects the new user input, it can stop the current playback of the audio file, and proceed with obtaining the next audio file (if any) based on the user input.

As noted above, the configuration of the client device may include allowing the user to indicate a level of experience, and to indicate a speed of audio reading. The user may also be allowed to edit a verbosity setting, which indicates how verbose the readings should be (e.g., skip certain words, only read portions of certain words or use short forms to abbreviate certain words, etc.), choose a voice pitch or desired reader (e.g., male or female voice), or any other desired characteristic of the audio. The user may also activate/deactivate the voice announcements as desired.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting.

This patent is limited only as defined in the following claims and equivalents thereto.

The invention claimed is:

1. One or more non-transitory computer-readable media storing instructions that, when executed, cause:
   receiving, by a computing device, user input that causes highlighting of a content item, of a user interface displayed by a display device, that is selectable to cause output of a content item via the display device;
   based on the user input, sending, to a plurality of different user devices different from the display device:
      a first audio announcement announcing, at a first playback speed, the highlighting of the content item of the user interface displayed by the display device; and
      after audio playback of the first audio announcement and based on subsequent user input that causes a subsequent highlighting of the content item of the user interface displayed by the display device, a second audio announcement announcing, at a second playback speed different from the first playback speed, the highlighting of the content item of the user interface displayed by the display device; and
   based on a user input selecting the content item, causing output of the content item via the display device.

2. The one or more non-transitory computer-readable media of claim 1, wherein the instructions, when executed, cause:
   selecting the first audio announcement by:
      determining a hash of text of the content item; and
      determining the first audio announcement by querying, based on the hash, a database of audio announcements.

3. The one or more non-transitory computer-readable media of claim 1, wherein the instructions, when executed, cause:
   generating, using a text-to-speech algorithm and based on text of the content item, the first audio announcement.

4. The one or more non-transitory computer-readable media of claim 1, wherein the second audio announcement is announced in a second language different from a language of the first audio announcement.

5. The one or more non-transitory computer-readable media of claim 1, wherein the second audio announcement comprises a second number of words different from a number of words in the first audio announcement.

6. One or more non-transitory computer-readable media storing instructions that, when executed, cause:
   determining, based on user input to browse a listing of content items and select a content item for output in a shared viewing experience, highlighting of a content item of a user interface currently displayed by a display device;
   sending, to a first user device associated with a first user and based on a first highlighting of the content item of the user interface displayed by the display device, a first audio announcement describing, at a first playback speed, the content item of the user interface currently displayed by the display device;
   sending, to a second user device associated with a second user and based on a second highlighting of the content item of the user interface displayed by the display device, a second audio announcement describing, at a second playback speed different from the first playback speed, the content item of the user interface currently displayed by the display device; and
   based on a user input selecting the content item, causing output of the content item via the display device.

7. The one or more non-transitory computer-readable media of claim 6, wherein the instructions, when executed, further cause:
   selecting the first audio announcement by:
      determining a hash of text of the content item; and
      determining the first audio announcement by querying, based on the hash, a database of audio announcements.

8. The one or more non-transitory computer-readable media of claim 6, wherein the second audio announcement is based on a strength of a data connection of the second user device.

9. The one or more non-transitory computer-readable media of claim 6, wherein the second audio announcement is based on a user preference associated with the second user device.

10. The one or more non-transitory computer-readable media of claim 6, wherein the second playback speed is different from the first playback speed.

11. An apparatus comprising:
   one or more processors; and
   memory storing instructions that, when executed by the one or more processors, cause the apparatus to:
      receive user input that causes highlighting of a content item, of a user interface displayed by a display device, that is selectable to cause output of a content item via the display device;
      based on the user input, send, to a plurality of different user devices different from the display device:
         a first audio announcement announcing, at a first playback speed, the highlighting of the content item of the user interface displayed by the display device; and
         after audio playback of the first audio announcement and based on subsequent user input that causes a subsequent highlighting of the content item of the user interface displayed by the display device, a second audio announcement announcing, at a second playback speed different from the first playback speed, the highlighting of the content item of the user interface displayed by the display device; and
      based on a user input selecting the content item, cause output of the content item via the display device.

12. The apparatus of claim 11, wherein the instructions, when executed by the one or more processors, further cause the apparatus to:
   select the first audio announcement by:
      determining a hash of text of the content item; and
      determining the first audio announcement by querying, based on the hash, a database of audio announcements.

13. The apparatus of claim 11, wherein the instructions, when executed by the one or more processors, further cause the apparatus to:
   generate, using a text-to-speech algorithm and based on text of the content item, the first audio announcement.

14. The apparatus of claim 11, wherein the second audio announcement is announced in a second language different from a language of the first audio announcement.

15. The apparatus of claim 11, wherein the second audio announcement comprises a second number of words different from a number of words in the first audio announcement.

16. An apparatus comprising:
   one or more processors; and
   memory storing instructions that, when executed by the one or more processors, cause the apparatus to:
      determine, based on user input to browse a listing of content items and select a content item for output in a shared viewing experience, highlighting of a content item of a user interface currently displayed by a display device;
      send, to a first user device associated with a first user and based on a first highlighting of the content item of the user interface displayed by the display device, a first audio announcement describing, at a first playback speed, the content item of the user interface currently displayed by the display device;
      send, to a second user device associated with a second user and based on a second highlighting of the content item of the user interface displayed by the display device, a second audio announcement describing, at a second playback speed different from the first playback speed, the content item of the user interface currently displayed by the display device; and
      based on a user input selecting the content item, cause output of the content item via the display device.

17. The apparatus of claim 16, wherein the instructions, when executed by the one or more processors, further cause the apparatus to:
   select the first audio announcement by:
      determining a hash of text of the content item; and
      determining the first audio announcement by querying, based on the hash, a database of audio announcements.

18. The apparatus of claim 16, wherein the second audio announcement is based on a strength of a data connection of the second user device.

19. The apparatus of claim 16, wherein the second audio announcement is based on a user preference associated with the second user device.

20. The apparatus of claim 16, wherein the second playback speed is different from the first playback speed.

* * * * *